United States Patent Office 2,856,372
Patented Oct. 14, 1958

2,856,372
LATEX CONTAINING CARBOXYMETHYL DEXTRAN

Leo J. Novak and Elwood P. Wenzelberger, Dayton, Ohio, assignors, by mesne assignments, to Midland Chemical Corporation, Dayton, Ohio, a corporation of Delaware No Drawing. Application June 24, 1954
Serial No. 439,152

2 Claims. (Cl. 260—17.4)

This invention relates to stabilized natural or synthetic rubber latex.

Latex is an aqueous dispersion of natural or synthetic rubber. In the case of the natural latex, proteins present therein as natural impurities function to some extent as stabilizers for the dispersion. However, in the case of both natural and synthetic latex it is desirable to include a protective stabilizing agent for the dispersion before shipping it to the ultimate user. A commonly used stabilizing and protective agent is casein which is usually applied in solution in ammonia, the latter being added to preserve the latex from putrefaction during shipping and storage.

An object of this invention is to provide new stabilizing agents for natural or synthetic rubber latex.

Another object is to provide stabilizing and protective agents for natural or synthetic rubber latex which also function to preserve the latex from putrefaction during storage and shipping.

A further object is to provide agents which are effective for stabilizing and protecting natural and synthetic latex in very small amounts.

These and other objects of the invention which will become apparent hereinafter are accomplished by incorporating in the latex, natural or synthetic, comparatively small amounts of carboxymethyl dextran.

The production of carboxymethyl dextran is described in the pending application of L. J. Novak et al., Ser. No. 346,016, filed March 31, 1953, now abandoned. In brief, the selected dextran and a carboxymethylating agent are reacted together in an aqueous alkaline medium whereby the carboxymethyl group is substituted for one or more hydroxyl groups in the dextran molecule.

Suitable carboxymethylating agents are chloracetic acid, sodium chloracetate or chloracetamide. The reaction is carried out in an aqueous solution of a strong alkali metal hydroxide such as sodium, potassium or lithium hydroxide. Preferably, the dextran is treated, in aqueous solution or suspension, with an excess of sodium or potassium chloracetate in the presence of an excess of sodium or potassium hydroxide at a temperature of 50° C. to 100° C. for ten minutes to two hours. Also preferably, the molar ratio of sodium chloracetate or potassium chloracetate to dextran is between 2:1 and 12:1, the molar ratio of sodium or potassium hydroxide to dextran is 5:1 to 15:1, and the molar ratio of water to dextran is 70:1 to 120:1.

The carboxymethyl dextrans thus obtained have a D. S. (degree of substitution or average number of carboxymethyl groups per anhydroglucopyranosidic unit) of less than 1:1 to 3:1.

The initial reaction product is a viscous mass comprising the sodium or potassium salt of the carboxymethyl dextran, from which the salt may be precipitated by a non-solvent therefor such as a water-miscible alcohol or ketone, e. g., methyl, ethyl, propyl, isopropyl or t-butyl alcohol or acetone.

The free ether may be recovered from the salt by mixing the latter with water, acidifying, preferably to pH 2.0, and precipitating the ether by means of a ketone or alcohol as mentioned above.

The dextran carboxymethylated may be obtained in various ways. Usually, it is biosynthesized from sucrose using microorganisms of the *Leuconostoc mesenteroides* or *L. dextranicum* types. Microorganisms (or their enzymes) which may be used include those bearing the following NRRL (Northern Regional Research Laboratory) designations: *Leuconostoc mesenteroides* B–512, B–119, B–1146, B–1190, B–742, B–1191, B–1196, B–1208, B–1216, B–1120, B–1144, B–523; *Streptobacterium dextranicum* B–1254 and *Betabacterium vermiforme* B–1139.

The dextran is produced by introducing a culture of the microorganism, or the enzyme filtered therefrom, into an aqueous sucrose-bearing nutrient medium and holding the mass until the dextran is synthesized in maximum yield, after which it is precipitated by addition of a water-miscible aliphatic alcohol or ketone. The precipitated "native" dextran is preferably purified and reduced to particulate condition for carboxymethylation. This "native" dextran is normally characterized by very high molecular weight, calculated to be in the millions. It may be carboxymethylated at the native molecular weight or it may be partially hydrolyzed to lower molecular weight in any suitable way, prior to reaction with the carboxymethylating agent. In general, the dextran may have a molecular weight of 5000 to $150 \times 10^6$ determined by light scattering measurements, and may be a "native" dextran biosynthesized from sucrose under specially controlled conditions such that the molecular weight is lower than that of native dextran produced under conventional conditions.

Relatively small amounts of carboxymethyl dextran may be used in practicing the invention. However, a preferred carboxymethyl dextran for the present purposes is the ether derived from high molecular weight *Leuconostoc mesenteroids* native, unhydrolyzed B–512 dextran (or an equivalent of that native dextran) and containing an average of 2.0 to 3.0 carboxymethyl groups per A. G. U. This carboxymethyl dextran is preferred because of its striking effectiveness in stabilizing the latex in small concentrations, such as amounts between 0.2% and 0.5% by weight.

The carboxymethyl dextran is incorporated by stirring it into the latex after the latter has been prepared.

The rubber latex stabilized may be natural or synthetic rubber latex or concentrated or creamed natural rubber latex, or pre-vulcanized rubber latex. Further, the latex may be heat-sensitized by adding to it suitable heat-unstable materials adapted to facilitate coagulation on heating. The invention is not limited to the stabilization of natural rubber latex as other artificial latices such as formed by dispersing synthetic rubbers in water may be treated. In these latter compositions, the carboxymethyl dextran may function as the stabilizing and protective agent and as dispersant for the rubber particles. The synthetic rubber may comprise, for example, polymerized butadiene, isobutylene polymers, chloroprene polymers.

The usual rubber compound ingredients such as sulfur, zinc oxide; accelerators such as, for example, diphenyl guanidine, "Pip-Pip" (piperidine pentamethylene dithiocarbomate), "Captax" (mercaptobenzothiazole) and tetramethylthuriam disulfide; antioxidants such as "Antox" (condensation product of butyraldehyde-aniline), "Santiflex B" (reaction product of acetone and p-aminodiphenyl) and "Agerite Alba" (p-benzyloxy-phenol); lubricants such as stearic acid, "Seriate" (a kind of muscovite) and "Aresplene" (the sodium salt of an alkylated aryl compound marketed by Monsanto Chemical Co.); may be included in the latex before, after, or simultaneously with incorporation of the carboxymethyl dextran therein. The carboxymethyl dextran does not interfere with such conventional compounding ingredients or require changes in the manner in which the latex is handled.

The latex may be vulcanized directly or after formation into a rubber article of desired shape. The articles may be formed by the well-known dipping method with curing on the mold or form. Also, the stabilized latex may be formed into a rubber thread by the conventional procedure of extruding the stable latex through small orifices into a coagulating and dehydrating bath, followed by washing, drying and vulcanizing of the thread in a continuous manner. The latex may also be used for impregnating textiles, or it may be used to obtain sponge rubber by whipping air into the stabilized latex containing, in addition to the carboxymethyl dextran, a dormant coagulant that becomes effective at a critical temperature and heating the whipped mass to complete the vulcanization. Dormant coagulants which are representative include sodium fluorosilicate, ammonium acetate, calcium formate and zinc ammonium chloride.

Fillers may be included in the latex-carboxymethyl dextran mixture, useful fillers including those of the cellulosic type such as wood pulp or wood flour, as well as asbestos fibers, mineral wool, glass fibers and mineral pigments.

The stable latex may be given a comminuted form in any of the known ways, as by adding the latex containing the carboxymethyl dextran to the coagulant while simultaneously stirring or agitating the same thus causing the precipitant to form in the shape of crumbs or granules.

For purposes of further description and of illustration only and not as limitative, there are given the following examples of specific embodiments of the invention.

*Example I*

About 5 parts by weight of carboxymethyl dextran derived from *L. m.* B-512 high molecular weight native dextran and having a D. S. of about 2.8 are added to 200 parts by weight of 64.5 percent latex. The mixture is agitated until a creamy, homogeneous, stable mass results.

Instead of precipitating the stabilized latex as crumbs or granules by agitation of the latex with the coagulant, a comminuted or powdered product may be obtained by extruding, casting or otherwise shaping the latex containing the carboxymethyl dextran into a layer, film, filament or rod, coagulating the latex in that form, and thereafter mechanically comminuting the shaped structure as by grinding, chopping or cutting.

Various changes and modifications may be made in details in practicing the invention. Since such changes may be made within the disclosure and without departing from the spirit and scope of the invention, it is to be understood that it is not intended to limit the invention except as defined in the appended claims.

The term "rubber latex" as used in the claims is intended to include both natural and synthetic latices.

What is claimed is:

1. A composition consisting of a creamy, homogeneous mass composed in parts by weight of 5 parts carboxymethyl dextran and 200 parts of latex containing 64.5% rubber.

2. A composition consisting of a creamy, homogeneous mass composed in parts by weight of 5 parts carboxymethyl dextran from high molecular weight native dextran and having a D. S. of about 2.8 and having admixed therewith 200 parts of latex containing 64.5% rubber.

References Cited in the file of this patent
UNITED STATES PATENTS

| | | |
|---|---|---|
| 2,518,135 | Gaver | Aug. 8, 1950 |
| 2,537,190 | Lankan et al. | Jan. 9, 1951 |
| 2,602,082 | Owen | July 1, 1952 |
| 2,666,042 | Nozaki | Jan. 12, 1954 |
| 2,671,779 | Gaver | Mar. 9, 1954 |